United States Patent [19]

Cox et al.

[11] Patent Number: 4,975,477

[45] Date of Patent: * Dec. 4, 1990

[54] POLYESTER FORMULATIONS FOR HOT-MELT WOOD ADHESIVES

[75] Inventors: Abraham J. Cox; Max F. Meyer, Jr., both of Kingsport, Tenn.

[73] Assignee: Eastman Kodak Company, Rochester, N.Y.

[*] Notice: The portion of the term of this patent subsequent to Oct. 30, 2007 has been disclaimed.

[21] Appl. No.: 334,428

[22] Filed: Apr. 7, 1989

[51] Int. Cl.$^5$ .............................................. C08L 23/26
[52] U.S. Cl. ...................................... 524/77; 528/272; 528/295.5; 528/302; 528/307; 528/308.6; 528/308; 525/437; 525/444; 525/444.5; 524/751; 524/753; 524/764
[58] Field of Search ..................... 528/272, 295.5, 302, 528/307, 308.6, 308; 525/437, 444, 444.5; 524/77, 751, 753, 764

[56] References Cited

U.S. PATENT DOCUMENTS

| | | | |
|---|---|---|---|
| 4,094,721 | 6/1978 | Sturm et al. | 156/309 |
| 4,299,934 | 11/1981 | Petke et al. | 525/173 |
| 4,419,507 | 12/1983 | Sublett | 528/302 |
| 4,576,997 | 3/1986 | Trotter et al. | 525/444 |
| 4,618,643 | 10/1986 | von Voithenberg et al. | 524/430 |

FOREIGN PATENT DOCUMENTS 1402648  8/1975  United Kingdom .

*Primary Examiner*—John Kight, III
*Assistant Examiner*—Sam A. Acquah
*Attorney, Agent, or Firm*—Thomas R. Savitsky; William P. Heath, Jr.

[57] ABSTRACT

Disclosed are certain polyester adhesive blend compositions comprising about 45–90 wt. percent of a copolyester, about 3–15 wt. percent of a plasticizer, and about 7–40 wt. percent of a tackifying resin. The blends are particularly useful in hot-melt glue gun applications.

22 Claims, No Drawings

POLYESTER FORMULATIONS FOR HOT-MELT WOOD ADHESIVES

FIELD OF INVENTION

The present invention concerns certain polyester adhesive blend compositions containing certain tackifying resins and plasticizers.

BACKGROUND OF THE INVENTION

Hot-melt glue guns are becoming increasingly popular for various adhesive applications. An example of a glue gun adapted to be held in the hand of an operator and used to dispense hot-melt adhesives can be found in U.K. Patent Specification No. 1402648.

In general, it is well known to provide glue guns adapted to be held in the hand of an operator with a melt chamber in which an end portion of a stick is received and melted by heat supplied to the melt chamber. Progressive melting of the glue stick may be achieved by pressing the glue stick into the melt chamber by means of the operator's thumb or a mechanical feed mechanism. Melted adhesive is dispensed from a nozzle of the gun as the stick is fed into the melt chamber and melted therein.

Certain polyester-based adhesives are known in the art to be useful in glue gun applications; however, these adhesives suffer several disadvantages (see U.S. Pat. No. 4,618,643).

Polyester adhesives are normally used in powder, film, or web form for bonding and laminating applications. They can be processed easily in extruders where temperatures can be raised to obtain the lower melt viscosities needed for the application. However, with hand-held glue guns, it is not practical or safe to use processing temperatures greater than 190° C. or adhesives with melt viscosity values greater than about 50,000 centipoise (cP) at 190° C. for preparing bonds. Most polyester adhesives have melt viscosity values in the range of about 75,000 to about 300,000 cP at 190° C. and are not suitable for these applications. In general, if the inherent viscosity (I.V.) of polyesters is reduced to levels so that the melt viscosity at application temperature is less than about 50,000 cP, the bonding properties of the polyester adhesive for hot-melt applications are often reduced to an unacceptable level due to faster crystallization times and shorter open time of the adhesive and the reduced tensile strength of the bulk polymer.

It would be desirable to have a polyester formulation that has excellent bonding properties and acceptable melt viscosities for glue gun adhesive applications.

SUMMARY OF INVENTION

It has now been found that selected polyester adhesive blend compositions containing certain tackifying resins and plasticizers can provide the desired melting point range and the low viscosities required for use in hand-held, hot-melt glue guns. These compositions are especially useful in bonding wood substrates.

The present invention is directed to a hot-melt adhesive blend for use with a glue gun comprising
(I) about 45-90 weight percent of a copolyester comprising
   (A) an acid component comprising repeating units of
      (1) about 60 to 100 mol % (preferred is 70 to 100 mol %) of isophthalic acid, terephthatic acid, or a mixture thereof, and
      (2) about 0 to 40 mol % (preferred is 0 to 30 mol %) of dicarboxylic aliphatic or cycloaliphatic acid having from 4 to 20 carbon atoms, and
   (B) a glycol component comprising repeating units of at least one aliphatic glycol having from 2 to 12 carbon atoms,
wherein the total mol % of acid component and glycol component are each 100 mol %; the inherent viscosity of the copolyester is about 0.4 to about 0.8 determined at 25° C. in 60/40 (wt/wt) phenol/tetrachloroethane at a concentrate of 0.5 gram/100 ml; said copolyester has a heat of fusion of less than about 20 calories per gram, and said copolyester has a melting point of about 90°-150° C.,
(II) about 3-15 weight % of a plasticizer, and
(III) about 7-40 weight % of a tackifying resin,
wherein the melt viscosity of the blend is about 10,000 to about 50,000 cP at application temperature.

DETAILED DESCRIPTION OF THE INVENTION

In the blend of the present invention, it is preferred that the amount of component (I) is about 60-85 weight %, the amount of component (II) is about 5-10 weight %, and the amount of component (III) is about 10-30 weight %.

It is also preferred that the melt viscosity of the blend is about 20,000 to about 40,000 cP at application temperature (e.g., 190° C. or greater).

The plasticizer (Component (II)) useful in the present invention can be any plasticizer that is capable of sufficiently plasticizing polyester.

Suitable plasticizers are either commercially available or can be prepared by techniques well known in the art. It is possible to use as the plasticizer component a long chain polyfunctional polyol, for example a polycaprolactone diol or a hydroxy polyester. It is also desirable to use a plasticizer which also contributes to handling properties of the glue stick, for example a small amount of slipperiness of the glue stick is desirable when using the glue stick in a glue gun. Examples of preferred plasticizers include neopentyl glycol dibenzoate, butyl benzyl phthalate, dioctyl phthalate, and dioctyl azelate. It is preferred to add the plasticizer after formation of the copolyester.

The tackifying resin (Component (III)) of the present invention can be any such resin commonly used to tackify polyester-based adhesives. Such resins can be liquid or solid, but solid is preferred.

The tackifying resins useful in the adhesive compositions of this invention can be hydrogenated rosins, which include ethylene glycol, polyethylene glycol, glycerol and pentaerythritol rosin esters, hydrogenated rosin esters or methylated rosin esters. For example, the commercially available materials include "Staybelite" Ester 3, triethylene glycol ester of hydrogenated rosin, and "Foral" 85 and 105, highly stabilized ester resins of pentaerythritol and rosin base.

The hydrogenated rosins and rosin esters can be used either alone or in combinations. These tackifying resins preferably have softening points of at least 100° C. and most preferably at least 120° C.

Of course, two or more copolyesters, plasticizers, and/or tackifying resins may be used in the blends of the invention.

The polyesters useful in the blends of the present invention can be made using typical polycondensation techniques well known in the art (see, for example, U.S. Pat. Nos. 4,094,721 and 4,419,507, incorporated herein by reference in their entirety).

It is preferred that copolyesters useful in the blend of the present invention have an inherent viscosity (I.V.) in the range of about 0.5 to about 0.75. It is also preferred that the melting points (Tm) of the copolyesters useful in the present invention are about 90° C. to about 150° C., and more preferred are about 100° C. to about 130° C. Tm can typically be measured by differential scanning calorimetry (DSC).

In order to minimize thermal degradation and hydrolytic reactions of copolyesters catalyzed by carboxylic acids during production, or use of the glue stick in the glue gun, it is preferred to ensure that the acid number of the copolyester is kept as low as possible, for example less than about 3 mg KOH/g polyester. In addition, it is preferred to employ an antioxidant, for example an ester of phosphoric acid, in order to enhance stability at high temperatures, e.g., up to about 240° C.

Adhesives according to the invention may also include other additives if desired, for example colorants, i.e., dyes or pigments; and the like, up to about the 3% level, preferably up to about 1%, based on the weight of the total adhesive composition. Minor quantities of fillers also may be included to serve as nucleating promoter and are desirable in those cases where a more rapid build up of crystallinity is desired. For this purpose it is preferred to employ up to about 1% by weight of the composition of an inert filler for example polyethylene or more preferably an inorganic material for example titanium oxide or calcium carbonate.

In the polyester useful in the blends of the present invention, it is preferred that component (I)(A)(2) is glutaric acid and that component (I)(B) is ethylene glycol, diethylene glycol, 1,4-butanediol, 1,6-hexanediol, 1,4-cyclohexanedimethanol, 1,10-decanediol, or a mixture thereof.

Also, it is preferred that the adhesive blend of the present invention has a lap-shear strength of greater than about 400 pounds per square inch (psi), more preferably greater than about 500 psi, when applied as an adhesive to oak or pine. Lap-shear strength can be measured by an Instron machine at a 0.05-0.5 in/min crosshead speed at 23° C. after the bonds have aged at least 24 hours.

The blends of the present invention can be prepared using blending techniques well known in the art, for example, by processing in an extruder followed by well known standard pelletization processes, or the blends may be extruded into rods or cast into a tubular mold specified to size to be fed to hand-held, hot-melt glue guns (see, for example, U.S. Pat. No. 4,618,643, incorporated herein by reference in its entirety). The glue sticks may be aged in the mold overnight until they have developed at least some crystallinity before using them.

Other preferred embodiments of the adhesive blend of the present invention include wherein:

Component (I)(A)(1) is about 75 to 100 mol % terephthalic acid and 0 to about 25 mol % isophthalic acid; component (I)(B) is about 20 to 40 mol % 1,4-butanediol and about 60 to 80 mol % 1,6-hexanediol; component (I)(A)(1) is about 60 to 80 mol % terephthalic acid and component (I)(A)(2) is correspondingly about 20 to 40 mol % of a $C_4$ to $C_{20}$ aliphatic or cycloaliphatic dicarboxylic acid; component (I)(B) is about 55 to 65 mol % 1,4-butanediol and about 35-45 mol % diethylene glycol; component (I)(A)(1) is about 100 mol % terephthalic acid and component (I)(B) is correspondingly about 80 mol % 1,6-hexanediol and about 20 mol % 1,4-butanediol; component (I)(A)(1) is about 75 mol % terephthalic acid, component (I)(A)(2) is about 25 mol % glutaric acid, and component (II)(B) is correspondingly about 60 mol % 1,4-butanediol and about 40 mol % diethylene glycol; or component (I)(A)(1) is about 80 mol % terephthalic acid and about 20 mol % isophthalic acid; and component (I)(B) is about 80 mol % 1,6-hexanediol and about 20 mol % 1,4-butanediol.

The following examples are to illustrate the present invention but should not be interpreted as a limitation thereon.

EXAMPLES Example 1

A copolyester adhesive [poly(tetramethylene terephthalate) modified with 26 mol % glutaric acid and 40 mol % diethylene glycol; Tm 120° C.; I.V. 0.75, melt viscosity 150,000 cP at 190° C. (measured on a Brookfield Thermosel Viscometer)] is physically blended with a pentaerythritol ester of hydrogenated rosin (tackifying resin) and neopentyl glycol dibenzoate (plasticizer) in the ratio 80% copolyester/10% rosin ester/10% neopentyl glycol dibenzoate. The physical blend is extruded with a 0.75-in. extruder at 130°–145° C. to prepare a melt blend and is then pelletized. The resulting blend has a melt viscosity value of 40,000 cP at 190° C. (measured on a Brookfield Thermosel Viscometer). The pellets are then fed into the heating chamber of a hand-held, hot-melt adhesive applicator and melted at a temperature of 150°–170° C. Molten adhesive is applied from the applicator onto a 1 in.×3 in.×0.25 in. pine bar, and another pine bar is placed on the adhesive coated bar to give a 1-in.$^2$ lap-shear bond. Three bonded samples are prepared in this manner. The bonds are allowed to age at room temperature for at least 24 hours before testing. The three bonded samples are tested for bond strength by pulling them apart using an Instron machine and a crosshead speed of 0.5 in./min. The average lap-shear bond strength is 520 psi.

An attempt is made to make bonds with the unmodified copolyester (i.e., without plasticizers and tackifying resin), but the melt viscosity is so high that an adequate amount of adhesive cannot be applied before the adhesive cools and becomes too viscous to make a bond.

Example 2 (Comparative)

A copolyester adhesive [poly(tetramethylene terephthalate) modified with 27 mol % glutaric acid and 42 mol % diethylene glycol; Tm 115° C.; I.V. 0.83, melt viscosity 300,000 cP at 190° C. (measured on a Brookfield Thermosel Viscometer)] is molded into about a ½ in. diameter by about 3 in. long rod at about 150° C. The rod is fed into a hot-melt glue gun with a trigger feed like that made by Loctite Corporation. The rod will melt in the heating chamber where a temperature of about 150° C. is reached, but the molten adhesive is very slow to feed from the applicator nozzle of the gun, and the rod will not continuously feed into the heating chamber with the gun trigger. The polymer is so viscous that an adequate amount of adhesive cannot be applied to the substrate to be bonded. This example demonstrates that samples with melt viscosities as high as 300,000 cP at 190° C. will not apply properly from this type of hot-melt gun.

Example 3 (Comparative)

A copolyester adhesive [poly(tetramethylene terephthalate) modified with 12 mol % isophthalic acid and 20 mol % sebacic acid; Tm 175° C.; I.V. 0.38; melt viscosity 5,000 cP at 190° C. (measured on a Brookfield Thermosel Viscometer)] is used to prepare bonds with pine substrate at 190° C. in a manner similar to that given in Example 1. The molten adhesive turns to an opaque color in less than ten seconds after it is applied from the hot-melt applicator to the pine. The bonded samples delaminate very readily when bent by hand after two hours and after over 24 hours of aging at ambient conditions, indicating very weak lap-shear strength. This example demonstrates that polyester adhesives with low I.V. and low melt viscosity values that crystallize rapidly will not give bonds with sufficient strength when applied from the type of hot-melt gun as described in Example 1.

Example 4 (Comparative)

A copolyester as described in Example 1 is physically blended with neopentyl glycol dibenzoate in the ratio of 80% copolyester/20% neopentyl glycol dibenzoate. The physical blend is extruded with a 0.75 in. extruder at 130°–145° C. to prepare a melt blend and is pelletized. The resulting melt blend has a melt viscosity of 35,000 cP at 190° C. (measured on a Brookfield Thermosel Viscometer). This blended material is then used to prepare bonds with pine substrate in a manner similar to that given in Example 1. The pine bonds have an average lap-shear strength of only 190 psi. This example illustrates the lower bond strength that is achieved with polyester adhesives with levels of plasticizers as high as 20%.

Example 5

A copolyester adhesive [poly(hexamethylene terephthalate) modified with 20 mol % 1,4-butanediol; Tm 128° C.; I.V. 0.73; melt viscosity 200,000 cP at 190° C. (measured on a Brookfield Thermosel Viscometer)] is blended with hydrogenated rosin ester and a plasticizer as used in Example 1 in the ratio of 65% copolyester/25% rosin ester/10% plasticizer. The blend has a melt viscosity value of 28,000 cP at 190° C. (measured on a Brookfield Thermosel Viscometer). Bonds are prepared with pine and oak substrates, aged, and tested in a similar manner as given in Example 1. The pine bonds have an average lap-shear bond strength of 530 psi, and the oak bonds have an average lap-shear strength of 510 psi.

An attempt is made to make bonds with the unmodified polyester (i.e., without plasticizers and tackifying resin), but the melt viscosity is so high that an adequate amount of adhesive cannot be applied before the adhesive cools and becomes too viscous to make a bond.

Example 6 (Comparative)

A copolyester as described in Example 5 is melt blended with a rosin ester like that used in Example 1 in a ratio of 60% copolyester/40% rosin ester. The melt viscosity of the blend is 3,200 cP at 190° C. (measured on a Brookfield Thermosel Viscometer). Bonds are prepared with pine substrates and tested in a similar manner as given in Example 1. The pine bonds have a lap-shear strength of only 200 psi. This example demonstrates the lower bond strength that is achieved when relatively high I.V., high melt viscosity copolyester adhesives are blended only with high amounts of tackifying resins to reduce melt viscosity.

Example 7

A blend is prepared as in Example 5, except that 10% of butyl benzyl phthalate is added rather than neopentyl glycol dibenzoate. Bonds are prepared with pine and oak substrates, aged, and tested in a manner as given in Example 1. The pine bonds have an average lap-shear strength of 510 psi and the oak bonds have an average lap-shear strength of 500 psi.

Example 8

A copolyester adhesive [poly(hexamethylene terephthalate) modified with 20 mol % isophthalic acid and 20 mol % 1,4-butanediol; Tm 105° C.; I.V. 0.62; 100,000 cP melt viscosity at 190° C.] is blended with hydrogenated rosin ester and a plasticizer as used in Example 1 in the ratio of 72.5% copolyester/20% rosin ester/7.5% plasticizer. The melt viscosity of the blend at 190° C. is 27,000 cP (measured on a Brookfield Thermosel Viscometer). Bonds are prepared with pine and oak substrates, aged, and tested in a similar manner as given in Example 1. The pine bonds have an average lap-shear strength of 499 psi, and the oak bonds have an average lap-shear strength of 650 psi.

We claim:

1. A hot-melt adhesive blend for use with a glue gun comprising
   (I) about 45–90 weight percent of a copolyester comprising
      (A) an acid component comprising repeating units of
         (1) about 60 to 100 mol % of isophthalic acid, terephthatic acid, or a mixture thereof, and
         (2) about 0 to 40 mol % of a dicarboxylic aliphatic or cycloaliphatic acid having from 4 to 20 carbon atoms, and
      (B) a glycol component comprising repeating units of at least one aliphatic glycol having from 2 to 12 carbon atoms,
   wherein the total mol % of acid component and glycol component are each 100 mol %; the inherent viscosity of the copolyester is about 0.4 to about 0.8 determined at 25° C. in 60/40 (wt/wt) phenol/tetrachloroethane at a concentration of 0.5 gram/100 ml; said copolyester has a heat of fusion of less than about 20 calories per gram, and said copolyester has a melting point of about 90°–150° C.,
   (II) about 3–15 weight % of a plasticizer, and
   (III) about 7–40 weight % of a tackifying resin,
   wherein the melt viscosity of the blend is about 10,000 to about 50,000 cP at application temperature.

2. The blend of claim 1 wherein the amount of Component (I) is about 60–85 weight %, the amount of component (II) is about 5–10 weight %, and the amount of component (III) is about 10–30 weight %.

3. The blend of claim 1 wherein said melt viscosity is about 20,000 to about 40,000 cP and wherein the inherent viscosity of component (I) is about 0.5 to about 0.75.

4. The blend of claim 1 wherein component (II) is butyl benzyl phthalate, dioctyl phthalate, dioctyl azelate, neopentyl glycol dibenzoate, or a mixture thereof.

5. The blend of claim 1 wherein component (III) is hydrogenated rosin, a rosin ester, or a mixture thereof.

6. The blend of claim 1 wherein component (III) is a pentaerythritol ester of hydrogenated rosin.

7. The blend of claim 1 wherein compound (I)(A)(2) is glutaric acid.

8. The blend of claim 1 wherein component (I)(B) is ethylene glycol, diethylene glycol, 1,4-butanediol, 1,6-hexanediol, 1,4-cyclohexanedimethanol, 1,10-decanediol, or a mixture thereof.

9. The blend of claim 1 wherein component (I)(A)(1) is about 75 to 100 mol % terephthalic acid and 0 to about 25 mol % isophthalic acid, and component (I)(B) is 20 to 40 mol % 1,4-butanediol, and 60 to about 80 mol % 1,6-hexanediol.

10. The blend of claim 1 wherein component (II) is neopentyl glycol dibenzoate, butyl benzyl phthalate, or a mixture thereof.

11. The blend of claim 9 wherein component (II) is neopentyl glycol dibenzoate, butyl benzyl phthalate, or a mixture thereof.

12. The blend of claim 1 having an average lap-shear strength of greater than about 400 psi, when applied as an adhesive to oak or pine.

13. The blend of claim 1 wherein component (I)(A)(1) is about 100 mol % terephthalic acid; component (I)(B) is about 80 mol % 1,6-hexanediol and about 20 mol % 1,4-butanediol.

14. The blend of claim 1 wherein component (I)(A)(1) is about 75 mol % terephthalic acid; component (I)(A)(2) is about 25 mol % glutaric acid; and component (II)(B) is about 60 mol % 1,4-butanediol and about 40 mol % diethylene glycol.

15. The blend of claim 1 wherein component (I)(A)(1) is about 80 mol % terephthalic acid and about 20 mol % isophthalic acid; and component (I)(B) is about 80 mol % 1,6-hexanediol and about 20 mol % 1,4-butanediol.

16. The blend of claim 13 wherein component (II) is neopentyl glycol dibenzoate, butyl benzyl phthalate, or a mixture thereof; and component (III) is a pentaerythritol ester of hydrogenated rosin.

17. The blend of claim 14 wherein component (II) is neopentyl glycol dibenzoate, butyl benzyl phthalate, or a mixture thereof; and component (III) is a pentaerythritol ester of hydrogenated rosin.

18. The blend of claim 15 wherein component (II) is neopentyl glycol dibenzoate, butyl benzyl phthalate, or a mixture thereof; and component (III) is a pentaerythritol ester of hydrogenated rosin.

19. The blend of claim 16 wherein the amount of component (I) is about 65 weight %, the amount of component (II) is about 10 weight %, and the amount of component (III) is about 25 weight %.

20. The blend of claim 17 wherein the amount of component (I) is about 80 weight %, the amount of component (II) is about 10 weight %, and the amount of component (III) is about 10 weight %.

21. The blend of claim 18 wherein the amount of component (I) is about 72.5 weight %, the amount of component (II) is about 7.5 weight %, and the amount of component (III) is about 20 weight %.

22. The blend of claim 1 wherein component (I)(A)(1) is about 60 to 80 mol % terephthalic acid; component (I)(A)(2) is about 20 to 40 mol % glutaric acid; component (I)(B) is about 55 to 65 mol % 1,4-butanediol, and about 35–45 mol % diethylene glycol.

* * * * *